United States Patent [19]

Onda et al.

[11] 4,145,132

[45] Mar. 20, 1979

[54] OPENING AND CLOSING DEVICE OF A CAMERA SHUTTER MECHANISM

[75] Inventors: Eiichi Onda; Mitsuo Koyama; Tadashi Nakagawa; Masanori Watanabe; Ichiro Nemoto, all of Yotsukaido all of Japan

[73] Assignee: Seiko Koki Kabushiki Kaisha, Japan

[21] Appl. No.: 751,161

[22] Filed: Dec. 16, 1976

[30] Foreign Application Priority Data

Dec. 19, 1975 [JP] Japan .............................. 50-171631[U]
Dec. 19, 1975 [JP] Japan .............................. 50-171632[U]

[51] Int. Cl.² .............................................. G03B 9/36
[52] U.S. Cl. .................................... 354/249; 354/226; 354/266
[58] Field of Search ............... 354/226, 266, 246, 245, 354/247, 248, 249

[56] References Cited

U.S. PATENT DOCUMENTS 3,691,923  9/1972  Kitai ..................................... 354/258
4,054,891  10/1977  Onda et al. ........................ 354/266 X Primary Examiner—Michael L. Gellner
Attorney, Agent, or Firm—Robert E. Burns; Emmanuel J. Lobato; Bruce L. Adams

[57] ABSTRACT

A camera shutter mechanism including a shutter opening member mounted for pivoting about a first axis between a closed position corresponding to a closed shutter and an open position corresponding to an open shutter, and a shutter closing member mounted for pivoting about a second axis between an open position corresponding to an open shutter and a closed position corresponding to a closed shutter. A movable driving member includes a coupling mechanism for releasably coupling the driving member to the shutter opening member to permit moving the shutter opening member by moving the driving member, and for releasing the shutter opening member from the driving member when the shutter opening member is moved from the open to the closed position. A first spring biases the driving member to move the shutter opening member from the closed to the opened position to initiate exposure, and a second spring biases the shutter closing member to move from the opened to the closed position to terminate exposure. A drive transmission lever mounted on the driving member is positioned for responding to movement of the shutter closing member to the closed position for returning the shutter opening member to the closed position.

3 Claims, 3 Drawing Figures

OPENING AND CLOSING DEVICE OF A CAMERA SHUTTER MECHANISM

BACKGROUND OF THE INVENTION

The present invention relates to an opening and closing device of a camera shutter mechanism. In case a shutter mechanism of the type that the opening and closing shutter blades are successively operated for making an exposure is applied to a miniature camera, with respect to directively, for example, the directively of the portion restricted by the finder eyepiece in a single lens reflex camera, as a means of reducing the size of a blade housing because of the height due to the directively, a method of fine division of each blade is well known. However, in case of such a division of shutter blades, the light interruption characteristic will be reduced by the decrease of close contact between the blades with each other or of their overlapping. In order to solve this problem, the applicant of this invention proposed, in the special application No. 57100/75, that by making the blades on one side return for the aid of light interruption after finishing the exposure operation, the opening or exposure aperture is covered with two sets of blades.

SUMMARY OF THE INVENTION

The present invention is an improvement of said former patent application, and provides a simplified, minimized camera shutter as the first object. The second of the present invention object is to provide a drive transmission member for making the opening blade return after finishing the explosure operation. The third object is to make the closing member strike one end of said drive transmission member at the region of completion of the operation of the closing member, and to make the opening member return by pushing the opening member with the other end. The fourth object is, even if the closing member rebounds when suddenly stopping, to prevent the opening member from returning to cause re-exposure. The fifth object is to decelerate the closing member by striking one end of the drive transmission member, thereby reducing the rebounding of the closing member. The sixth object is to obtain a durable shutter by providing an elastic portion at the place where the closing member strikes the drive transmission member to absorb the impulsive force of contact.

DETAILED DESCRIPTION OF THE INVENTION

Figure 1:
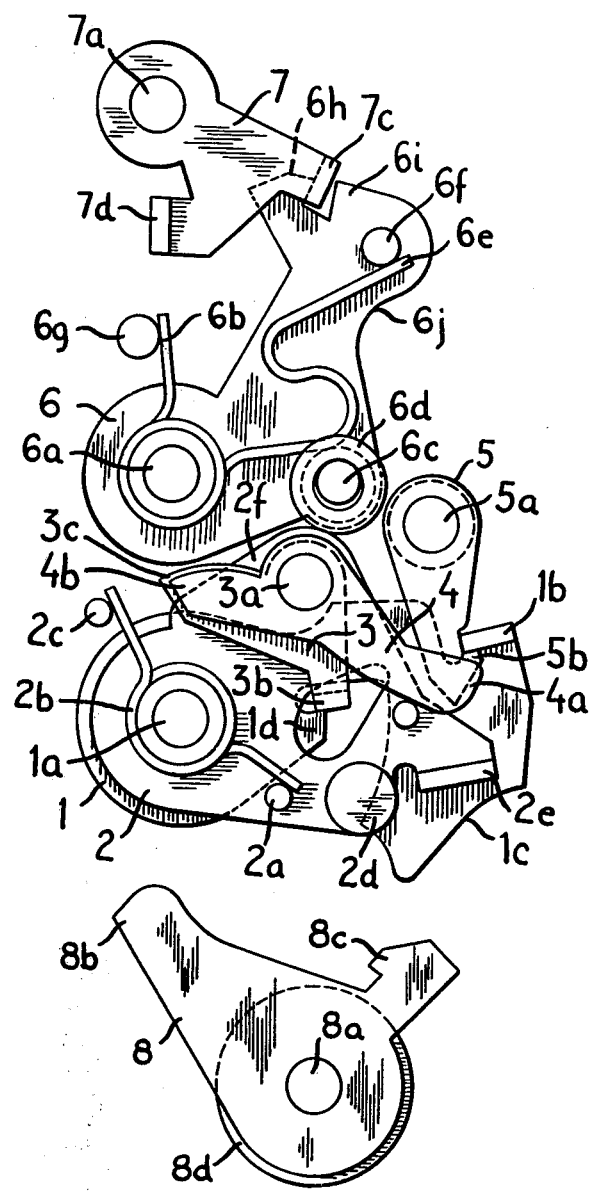
FIG. 1 is a plan view showing a state when a shutter mechanism according to the present invention is cocked.

In FIG. 1, on a base plate provided with a shutter opening (not shown in the figure) for film explosure are supported various members shown in the figure. An opening member 1 is rotatably supported by a shaft 1a and provided with a curved portion 1b on its right end, arch portion 1c, and a hook portion 1d in its center. A driving member 2 has a fixed pin 2a, and by a spring 2b acting thereon is energized or biased by a clockwise turning force, and the driving member 2 pivots on the shaft 1a. And the other end of the spring 2b is fixed with a fixing pin 2c. In the right portion on the driving member 2 are formed a cocking portion 2d and a curved portion 2e, and around the outer periphery thereof is formed a cam 2f. And on the driving member 2, a connecting hook or lever 3 is rotatably supported by a shaft 3a. A lower curved tab or portion 3b of the connecting hook 3 extends through an opening in the driving member 2 and energizes a clockwise turning spring (not shown in the figure), by engaging with the hooking portion or protrusion 1d of the opening member 1. The periphery of the connecting hook 3 is shaped having a projection 3c at the left end.

A drive transmission member 4 is pivoted on the shaft 3a and the right end portion 4a is engageable with the curved portion 1b of the opening member 1, and the left end portion 4b is somewhat recessed from the projection 3c to define a cam.

A opening hook 5 is rotatably supported by a shaft 5a, and the hook portion or protrusion 5b engages with the curved portion 1b to energize a counterclockwise turning spring (not shown in the figure). Since the spring or first biasing means 2b of the driving member 2 acts on the hook portion 1d through the connecting hook 3, the curved portion 1b is locked by the opening hook 5 from rotating in response to the force developed by the spring 2b.

The connecting hook or lever 3 mounted for rotation on the driving member 2 by shaft 3a constitutes coupling means for releasably coupling the driving member 2 to the shutter opening member 1 to permit moving the shutter opening member 1 by moving the driving member 2 and for releasing the opening member 1 from the driving member 2 when the shutter opening member 1 is moved from the open to the closed condition.

A closing member 6 is rotatably supported by a shaft 6a, and energized or biased by a clockwise turning force developed by a spring or second biasing means 6b. On the closing member 6 a pin 6c projects and a pipe 6d is on the pin 6c with a clearance. Against the outer periphery of the pipe 6d a spring 6b acts, and the free end 6e of the spring 6b is curved to engage with another pin 6f. The other end of the spring 6b is fixed to a fixing spring 6g. And the pipe 6d projects beyond the periphery of the closing member 6 to the operating portion of the cam 2f of the driving member 2. At the right upper end of the closing member 6 are formed a hook portion 6h, a convex portion 6i and a concave portion 6j.

A closing hook 7 is rotatably supported by a shaft 7a, and a spring (not shown in the figure) effective to bias the closing hook 7 to rotate clockwise is energized. And a lower curved portion 7c locks the hook portion 6h, and an upper curved portion 7d is provided.

A cocking lever 8 is rotatably supported by a shaft 8a, and a spring (not shown in the figure) effective to bias the cocking lever 8 to rotate counterclockwise is energized. The cocking lever 8 includes a cam portion 8b and a hook portion 8c. And an elastic pipe 8d formed as one unit is fixed to the under side of the cocking lever 8.

Next, the operation of this embodiment is described.

From the state in FIG. 1, when the opening hook 5 is, in relation to the shutter release, turned clockwise against its spring, the hook portion 5b releases the locked condition of the curved portion 1b of the opening member 1. When the locking of the curved portion 1b is released, since the opening member 1 is connected with the driving member 2 as though they were one body through the connective hook 3, the opening member 1 is turned clockwise by the spring 2b and begins to make an exposure by opening the exposure aperture (not shown in the figure). Then, at the termination period of operation of the driving member 2, the curved portion 2e engages with the locking portion 8c of the cocking lever 8, making the cocking lever 8 turn clockwise against its spring. The arch portion 1c of the opening member 1 engages with the elastic pipe 8d causing the pipe 8d to be compressed and deformed, and the cocking lever 8 which is integral with the elastic pipe 8d is made to turn counterclockwise, thereby locking the curved portion 2e with the concave portion of the locking portion 8c.

When the arch portion 1c engages with the elastic pipe 8d, the cocking portion 2d presses the cam portion 8b simultaneously and makes the cocking lever 8 turn counterclockwise. Accordingly, the opening member 1 is decelerated in the region of termination of its operation by engagement with the locking portion 8c, the elastic pipe 8d and the cam portion 8b. And at the same time, since because portion 2e of driving member 2 is locked by the concavity of the locking portion 8c, rebounding at the stopping position after running with a high speed is prevented.

Figure 2:
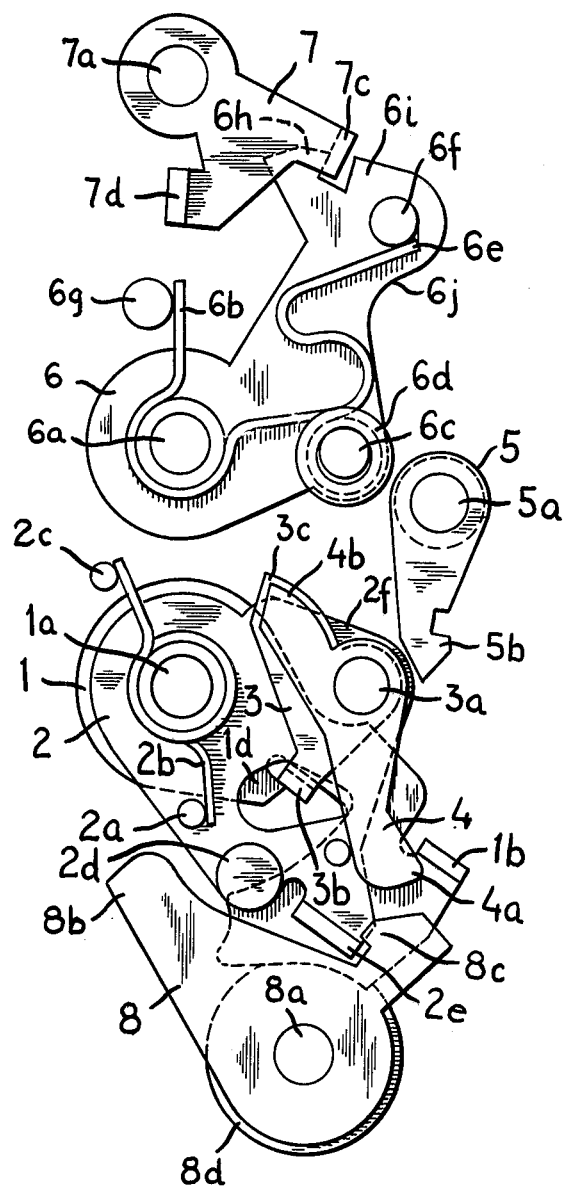
FIG. 2 is a plan view in which the shutter mechanism illustrated in FIG. 1 is in the opened state.

Although not shown in the figure, another stopping device is provided for regulating the position of the opening member 1 at the completion of its operation. The position of the opening member 2 at the completion of its operation is shown in FIG. 2.

When the desired exposure time has elapsed, the closing hook 7 is made to turn counterclockwise by a well known method, and the lower curved portion 7c releases the locked condition of the hook portion 6h. When the locked condition of the hook portion 6h is released, the closing member 6 turns clockwise by the spring 6b and closes the exposure aperture (not shown in the figure), thereby finishing the exposure.

In the region of completion of operation of the closing member 6, the pipe 6d engages with the projection 3c of the connecting hook 3, making the connective hook 3 turn counterclockwise around the periphery of the shaft 3a to release the engagement between the curved portion 3b and the hook portion 1d, and as a consequence the connection between the opening member 1 and the driving member 2 is released. If the closing member 6 is turned further, the pipe 6d engages with the left portion 4b of the drive transmission member 4 and makes the drive transmission member 4 turn counterclockwise around the shaft 3a so that the right end portion 4a pushes against the curved portion 1b and makes the opening member 1 turn counterclockwise thereby displace the member 1 in the direction of the closed position again. When the pipe 6d advancing for returning the opening member 1 to the closed condition again by releasing the drive transmission member 4, since the closing member 6 has already closed the exposure aperture, there is no influence on the exposure operation, and the closing member 6 finishes its operation when the concave portion 6j thereof comes in contact with the outer periphery of the shaft 5a.

The sequence of steps described above comprise the shutter exposure operation. In order that the shutter be cocked or charged again, the cocking lever 8 is turned clockwise around the shaft 8a against its spring, and the locking portion 8c releases the curved portion 2e, the cam portion 8b engages with the projection 2d to make the driving member 2 turn counterclockwise against the spring 2b, and at the same time the cam portion 2f engagaes with the pipe 6d making the pipe 6d turn counterclockwise around the shaft 6c.

The pipe 6d pushes the spring 6b, and the free end thereof pushes the pin 6f to make the closing member 6 turn counterclockwise around the shaft 6a.

When the cocking lever 8 is turned clockwise further, the driving member 2 and the closing member 6 are turned counterclockwise following the above-mentioned relation, and during the counterclockwise turning of the driving member 2, the curved portion 3b of the connecting hook 3 accompanies the hook portion 1d of the opening member 1 and the curved portion 3b is locked by the hook portion 1d in the operation finishing region of completion of rotation of the cocking lever 8. In the same region the curved portion 1b of the opening member 1 is locked with the hook portion 5b of the opening hook 5, and after the hook portion 6h of the closing member 6 has been locked with the curved portion 7c, the cocking lever 8 returns to the state shown in FIG. 1.

Figure 3:
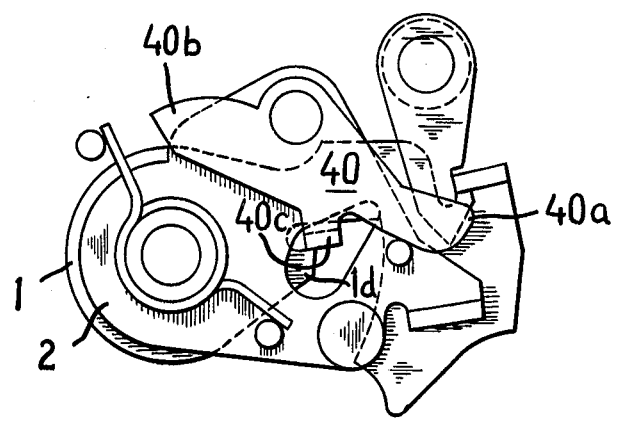
FIG. 3 is a partial plan view showing another embodiment of the shutter mechanism according to the present invention in a cocked state.

FIG. 3 shows another embodiment of this invention and serves to describe the essential features thereof, in which the connecting hook 3 is eliminated by forming a curved portion 40c in a drive transmission member 40. The state of the driving member 2 as shown in FIG. 3 corresponds to the state of the driving member 2 shown in FIG. 1. The method of operation is similar to that of the first described embodiment, namely, in the region of completion of the operation of the closing member 6, the pipe 6d makes the drive transmission member 40 turn counterclockwise against a spring by engaging with the left end portion 40b. After the curved portion 40c releases the locking of the hook portion 1d, the right end portion 40a pushes the curved portion 1b of the opening member to make the opening member 1 return in the direction of the open position again. Regarding the charging or cocking method, the description is omitted because it easily followed from that of the first described embodiment.

By the way, although the opening hook 5 locks the opening member 1 at the charged or opened position in the above mentioned embodiment, it is also possible to lock the driving member 2.

Also it is possible to mount the driving transmission member 4 and the connecting hook 3 on the opening member 1 or either of them on the opening member 1.

Furthermore, in order to ensure a firm positive return of the opening member, it is possible to spring bias the opening member, and to spring bias the drive transmission member. As is evident from the aforementioned description, after finishing the exposure operation in the region of the completion of the closing member operation, because the opening member instantly returns, even when rebounding occurs due to a sudden stopping of the closing member, the exposure aperture is covered by the opening member so that there occurs no re-exposure. And because the closing member impulsively strikes the drive transmission member, the closing member is decelerated so that rebounding is reduced. And when the closing member strikes the drive transmission member, in order to prevent the pipe 6d, the arms 3c, 4b, the shaft 3a, the arm 4a, and the curved portion 1b from being deformed or damaged by the impulsive force, the pipe 6a shifts in the direction of compressing the spring 6b to lessen the impulse. Consequently the durability of each member is promoted and a stable operation is secured. And instead of using the pipe 6d, it is allowable to have the arm 4b directly struck by the spring 6b.

There is no need of power for the return of the opening member; instead, as the power of the closing member is concurrently used, the construction is simplified to reduce the manufacturing cost. Moreover, by making the opening member return, two sets of blades cover the exposure aperture so that even if the light interruption characteristic of the closing member is not enough light interuption greater than the usual case is ensured. This fact leads to a small-sized housing portion of the closing blades, as well as to the lack of necessity for of a high-grade technique for securing a sufficient plane characteristic of the closing blades, which also reduces the manufacturing cost.

As described above, according to this invention, it is possible to obtain a shutter which has simple miniaturized construction but which has high durability at a low price.

We claim:

1. In a camera shutter mechanism for use with a camera shutter of the type having opening shutter blades and closing shutter blades;
    a shutter opening member movable between a closed position corresponding to a closed shutter and an open position corresponding to an open shutter;
    a shutter closing member mounted for pivoting about a first axis between an open position corresponding to an open shutter and a closed position corresponding to a closed shutter;
    a movable driving member mounted for pivoting about a second axis and including coupling means for releasably coupling said driving member to said shutter opening member to permit moving of said shutter opening member by moving of said driving member and for releasing said shutter opening member from said driving member when said shutter opening member is moved from the open to the closed position;
    first biasing means for biasing said driving member to move said shutter opening member from the closed to the open position to initiate exposure;
    second biasing means for biasing said shutter closing member to move from the open to the closed position to terminate exposure; and
    means mounted on said driving member responsive to movement of said shutter closing member to the closed position for returning said shutter opening member to the closed position.

2. In a camera shutter mechanism according to claim 1: wherein said means for returning said shutter opening member to the closed condition includes a lever and means mounting said lever for rotation on said driving member, and wherein said lever has a first end for engaging with said shutter closing member thereby to rotate when said shutter closing member moves to the closed position, and said lever has a second end including means for coupling with said shutter opening member to return the same to the closed position when said lever rotates.

3. In a camera shutter mechanism according to claim 1: wherein said coupling means for releasably coupling said driving member to said shutter opening member comprises a lever and means mounting said lever for rotation on said driving member, a protrusion extending from said shutter opening member, a tab extending from said lever and bearing against said protrusion as said driving member moves thereby to move said shutter opening member from the closed to the open position, and said lever having an arm engaged by said shutter closing member as the same moves to the closed position to rotate said lever so that said tab clears said protrusion when said shutter opening member is moved from the open to the closed position.

* * * * *